United States Patent Office — 3,734,806
Patented May 22, 1973

3,734,806
PREPARATION OF PLASTIC PRODUCTS FROM VINYL CHLORIDE/PROPYLENE COPOLYMERS
Meyer H. Danzig, Bloomfield, and Allen W. Carlson, Wayne, N.J., assignors to Air Products and Chemicals, Inc., Allentown, Pa.
No Drawing. Continuation-in-part of application Ser. No. 846,589, July 31, 1969. This application Aug. 30, 1971, Ser. No. 176,282
Int. Cl. B44f 1/00
U.S. Cl. 161—2  12 Claims

ABSTRACT OF THE DISCLOSURE

Vinyl chloride polymers, effective for forming rigid, dimensionally-stable molded products, can be modified by including therewith certain additives within specified low limits, to yield molding compositions which, when injection or compression molded, produce rigid, shaped articles that are transparent in the thin sections and opaque or translucent in the thick section.

---

This application is a continuation-in-part application of Ser. No. 846,589, filed July 31, 1969, now abandoned.

The present invention is concerned with the preparation of rigid, molded resinous products and more particularly with the preparation from a single molding composition of such products which are transparent in part and opaque or translucent in part.

In the manufacture of rigid, molded resinous products it is often desirable, for aesthetic or ornamental effects, or for utilitarian purposes, to have portions of such products transparent and other portions opaque or translucent. For example, interlocking parts for room dividers could desirably have the large flat sections clear for light transmission and/or visibility with supports and other thick sections opaque or translucent where light transmission or visibility is not needed and/or where opaque or translucent areas may serve to make visible a surface which would otherwise be imperceptible. Moreover, an item such as a one-piece letter opener could desirably have the opener blade transparent and the grip or handle opaque. Many other items made from solid resinous materials could desirably have both transparent and opaque or translucent parts.

It is the object of this invention to prepare rigid resinous compositions which can be molded to form products which are transparent in part and opaque or translucent in part.

It is a further object of this invention to provide a method of producing rigid, molded resinous products which are transparent in part and opaque or translucent in part from vinyl chloride polymers.

These and other objects will appear more clearly from the detailed description which follows.

It has now been found that rigid molded resinous products made by combining certain additives, within specified low limits, with certain vinyl chloride polymers and then injection or compression molding the resultant resinous composition or mixture into a single molded or rigid shaped article of varying thickness yields products, the thin portions of which are transparent while the thick portions are opaque or translucent. While it is not desired to be limited to any particular theory as underlying the present invention, it would appear that this technology is based upon compatibility limits of the additives coupled with the rate of cooling and consequent crystallization of semi-compatible additives. It has been found, for example, that the mixture obtained by the addition of less than one part of mineral oil to 100 parts of a vinyl chloride-propylene polymer yields, when compression molded, thick and thin products which are clear due to the compatibility and cooling rate which keeps the mineral oil droplets separated. When, however, one part or more of the mineral oil is added to 100 parts of the same polymer, compression molding of the resultant composition produces opaque or translucent pieces if the molded unit is ⅛ inch or more in thickness. The resinous composition obtained by the addition of two parts of mineral oil to 100 parts of the same polymer, compression molded in one step into a letter opener having a blade of up to about 1/16 to 3/32 of an inch thickness which was entirely clear and a handle about ¼ of an inch thick which was opaque. The clearness of the blade, on the one hand, would appear to be due to the relatively rapid cooling thereof which does not allow the mineral oil to form large globules or crystals. The opaque handle, on the other hand, would appear to be due to the slow cooling of the thick portion permitting the mineral oil to agglomerate into large globules or crystals.

The vinyl chloride polymers which are most advantageously used in accordance with the present invention are those obtained by the polymerization of vinyl chloride in admixture with propylene in a polymerization system containing a free-radical polymerization catalyst at a temperature of from 30 to 75° C. and a pressure of up to 250 p.s.i.g. The amount of propylene provided in the reaction mixture should be sufficient to yield vinyl chloride-propylene copolymers which contain at least 1% by weight of propylene, with a particularly useful range being from 2% to 8% by weight of propylene, but they can contain up to about 10% by weight. Outstandingly advantageous properties with respect to the present invention are exhibited by vinyl chloride-propylene copolymers containing 3% to 7% by weight of propylene. The preparation and properties of such preferred copolymers are described in the U.S. Pat. No. 3,468,858 of Charles A. Heiberger and Leon Fishbein.

In accordance with the present invention, controlled small amounts of semi-compatible additives are added to the resinous vinyl chloride polymers to impart opacity or translucence to the portions of the molded article that are more than about ⅛ of an inch in thickness. The additives which are added for this purpose are conventional lubricants such as fatty acids, e.g. oleic acid, synthetic waxes of the fatty amide and ester types, e.g. N,N'-ethylene bis stearamide, and the like, such as are well known to the art as disclosed in said Pat. No. 3,468,858. While about 0.1 to 1% of these additives have been added as lubricants to resinous molding compositions, it has been found that mineral oil in amounts of greater than 1 to not more than 3% are needed to obtain the objectives of this invention. With less than 1% of mineral oil, no opacity is imparted to the thick portions of the molded articles, while mineral oil levels above 3 parts per 100 parts of the resinous molding component produced unworkable, hazy materials. Optimum amounts to produce the desired effects can be readily determined by trial since some variations will be necessary because of the particular resinous polymer and additive used and/or the particular thickness dimensions of the molded article formed.

The rigid resinous compositions used in accordance with the present invention also have suitably added to them stabilizers, fillers, pigments and resins additives to modify properties as desired. Suitable stabilizers include alkyl tin mercaptides, di-octyl tin dilaurate, metal phenates such as zinc, lead or tin phenate, and barium n-nonyl phenate, fatty acid soaps of lead, cadmium, barium, calcium, magnesium and zinc, cadmium benzoate, triphenyl phosphite, mono-octyl diphenyl phosphite, di-(epoxyethyl)benzene, epoxidized fatty oils and manganous pyrophosphite, alone or in combination. Various other suitable stabilizers are disclosed in said U.S. Pat. No.

3,468,858. The amount of these compounds added should be as small as possible to effect the desired stabilization and is preferably in the range of from 0.5 to 5% by weight of the resinous material, although up to 10% by weight can be added.

The molded products produced in accordance with the present invention can be made in a range of colors merely by using compatible pigments having no effect upon the clarity of the product. Suitable pigments are those well known to the art for the pigmentation of vinyl polymers.

It will be understood that the above resinous compositions are suitably employed in practice in conventional particulate form, e.g. as pellets, powders or granules. Since the vinyl chloride-propylene copolymers possess excellent melt flow characteristics or dynamic processability, they can be readily converted to rigid molded products by injection or compression molding procedures. Rigid molded products are thereby obtained in which the portions 1/8 inch or less in thickness will be clear or transparent while the thicker portions, particularly those which are about 1/4 inch or more in thickness, will be translucent or even opaque.

The following example is illustrative of the present invention.

EXAMPLE I 100 parts of a vinyl chloride propylene copolymer containing 2-8% by weight of propylene having an average molecular weight, expressed in terms of intrinsic viscosity of 0.57 to 0.63 dl./g. in combination with a melt flow rate of 70 to 120 dg./min. and an apparent modulus of elasticity of at least 100,000 p.s.i. at a temperature within the range of from 65° C. to 80° C. were mixed with 2 parts of di-butyl tin mercaptide as a stabilizer. Three batches of the above composition were mixed with 0.5, 1.0 and 2.0 parts, respectively, of mineral oil. Each of these batches was then injection molded, in one step, into latter openers having a blade portion and a handle portion. The blade portion was 3/4 of an inch wide at the handle and 6 inches along ending in a pointed tip. The maximum thickness of the blade was 3/32 in. and the sides and end were tapered to a knife-like edge. The handle portion was 1 3/16 inches wide and 3/8 in. at the end and tapered to 1 in. wide and 5/16 in. thick adjacent the blade.

The molding compositions containing 0.5 and 1.0 part of mineral oil per 100 parts of the copolymer yielded products that were clear in both the thick handle portions as well as in the thin or blade portions. The molding composition containing 2.0 parts of mineral oil per 100 parts of the copolymer yielded letter openers the thin or blade portions of which were perfectly clear while the thick or handle portions were hazy or opaque.

It will be understood that the present invention is not limited to the foregoing example, since numerous variations will readily occur to those skilled in the art.

What is claimed is:

1. A method for the production of a rigid, molded, resinous article having sections of varying thicknesses, the thinnest of which is transparent and the thickest of which is opaque or translucent, which comprises (a) heating to a thermomolding temperature a molding composition comprised of (i) vinyl chloride-propylene copolymer containing from 1 to about 10 weight percent of propylene and (ii) for each 100 parts by weight of the vinyl chloride-propylene copolymer, greater than 1 to not more than 3 parts of mineral oil, (b) forming, by injection or compression molding, the heated composition into a rigid article having sections of varying thicknesses, of which the thinnest is one-eighth of an inch or less thick and the thickest is one-quarter of an inch or more thick, and (c) cooling the molded article so as to render transparent those sections thereof which are one-eighth of an inch or less thick and to render opaque or translucent those sections thereof which are one-quarter of an inch or more thick.

2. The method of claim 1 wherein the copolymer contains 2 to 8 weight percent of propylene.

3. The method of claim 2 wherein the copolymer contains 3 to 7 weight percent of propylene.

4. The method of claim 3 wherein the copolymer has an intrinsic viscosity of 0.57 to 0.63 dl./g., a melt flow rate of 70 to 120 dg./min., and an apparent modulus of elasticity of at least 100,000 p.s.i. at a temperature within the range of 65° C. to 80° C.

5. The method of claim 4 wherein the heated composition is formed by injection molding.

6. The method of claim 4 wherein the molding composition contains at least 2 and not more than 3 parts of mineral oil for each 100 parts by weight of the vinyl chloride-propylene copolymer.

7. The method of claim 6 wherein the heated composition is formed by injection molding.

8. The method of claim 6 wherein the molding composition contains a stabilizing amount of di-butyl tin mercaptide.

9. The method of claim 8 wherein the heated composition is formed by injection molding.

10. The article as produced in accordance with the method of claim 1.

11. The article as produced in accordance with the method of claim 4.

12. The article as produced in accordance with the method of claim 6.

References Cited

UNITED STATES PATENTS

| | | | |
|---|---|---|---|
| 3,468,858 | 9/1969 | Heiberger et al. | 260—87.5 |
| 3,193,604 | 7/1965 | Mercer | 264—209 |

MORRIS LIEBMAN, Primary Examiner

J. H. DERRINGTON, Assistant Examiner

U.S. Cl. X.R.

161—6, 116; 260—33.6 UA; 264—300, 325, 327, 328